United States Patent
Kuznetsov et al.

(10) Patent No.: US 9,641,614 B2
(45) Date of Patent: May 2, 2017

(54) DISTRIBUTED STORAGE DEFENSE IN A CLUSTER

(71) Applicant: Microsoft Technology Licensing, LLC, Redmond, WA (US)

(72) Inventors: Vyacheslav Kuznetsov, Sammamish, WA (US); Vinod R. Shankar, Woodinville, WA (US); Andrea D'Amato, Kirkland, WA (US); David Allen Dion, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 13/904,989

(22) Filed: May 29, 2013

(65) Prior Publication Data

US 2014/0359054 A1 Dec. 4, 2014

(51) Int. Cl.
*H04L 29/08* (2006.01)
*G06F 3/06* (2006.01)
*G06F 21/78* (2013.01)

(52) U.S. Cl.
CPC .......... *H04L 67/1097* (2013.01); *G06F 3/067* (2013.01); *G06F 3/0622* (2013.01); *G06F 3/0632* (2013.01); *G06F 3/0637* (2013.01); *G06F 21/78* (2013.01)

(58) Field of Classification Search
CPC ...... G06F 21/00; G06F 3/0622; G06F 3/0632; G06F 3/0637; G06F 3/067; G06F 21/604; G06F 21/62; H04L 67/1097; H04L 63/10; H04L 63/101
See application file for complete search history.

(56) References Cited

U.S. PATENT DOCUMENTS

| | | |
|---|---|---|
| 5,499,378 A | 3/1996 | McNeill, Jr. et al. |
| 5,668,943 A | 9/1997 | Attanasio et al. |
| 5,721,880 A | 2/1998 | McNeill, Jr. et al. |
| 6,173,374 B1 | 1/2001 | Heil et al. |

(Continued)

FOREIGN PATENT DOCUMENTS

WO   WO 2009/158217   12/2009

OTHER PUBLICATIONS

PCT International Search Report and Written Opinion in International Application PCT/US2014/039633, mailed Nov. 25, 2014, 12 pgs.
Plasil, F. et al., "An architectural view of distributed objects and components in CORBA, Java RMI, and COM/DCOM", Internet Citation, Jun. 1998, XP002326430, retrieved from the internet: www.informatik.uni-trier.de/~ley/db/journals/stp/stp19.html, retrieved on 4/28/2-5, 15 pgs.

(Continued)

*Primary Examiner* — Glenton B Burgess
*Assistant Examiner* — Brandon L Sykes (57) ABSTRACT

Embodiments provide a method and system for enabling access to a storage device. Specifically, a node may request admittance to a cluster that has read and write access to a storage device. The node seeking access to the storage device must be first be approved by other nodes in the cluster. As part of the request, the node seeking access to the storage device sends a registration key to a storage device. Upon expiration of a registration timer, the node seeking access to the storage device receives a registration table from the storage device and determines whether its registration key is stored in the registration table. If the registration key is stored in the registration table the node has been accepted in the cluster and as a result, has been granted read and write access to the storage device.

20 Claims, 9 Drawing Sheets

(56) References Cited

U.S. PATENT DOCUMENTS

| | | | |
|---|---|---|---|
| 6,178,529 B1 | 1/2001 | Short et al. | |
| 6,279,032 B1 | 8/2001 | Short et al. | |
| 6,954,881 B1 | 10/2005 | Flynn, Jr. et al. | |
| 6,965,936 B1 | 11/2005 | Wipfel et al. | |
| 7,240,098 B1 | 7/2007 | Mansee | |
| 7,260,678 B1 | 8/2007 | Agarwal et al. | |
| 7,350,074 B2* | 3/2008 | Gupta | H04L 63/0823 713/157 |
| 7,631,066 B1 | 12/2009 | Schatz et al. | |
| 7,739,677 B1 | 6/2010 | Kekre et al. | |
| 7,774,469 B2 | 8/2010 | Massa et al. | |
| 7,778,986 B2 | 8/2010 | Bish et al. | |
| 7,783,666 B1 | 8/2010 | Zhuge et al. | |
| 7,786,901 B2* | 8/2010 | Alberth, Jr. | G06F 1/1624 341/24 |
| 7,925,809 B2 | 4/2011 | Reece | |
| 8,365,301 B2* | 1/2013 | Miller | G06F 21/602 380/273 |
| 8,370,494 B1 | 2/2013 | Chen et al. | |
| 8,381,017 B2 | 2/2013 | Bae et al. | |
| 8,737,261 B2* | 5/2014 | Schieder | 370/236 |
| 2003/0065782 A1 | 4/2003 | Nishanov et al. | |
| 2005/0080982 A1 | 4/2005 | Vasilevsky et al. | |
| 2005/0132154 A1 | 6/2005 | Rao et al. | |
| 2006/0074940 A1 | 4/2006 | Craft et al. | |
| 2009/0327798 A1 | 12/2009 | D'Amato et al. | |
| 2010/0057923 A1 | 3/2010 | Petter et al. | |
| 2010/0077249 A1 | 3/2010 | Das et al. | |
| 2010/0167656 A1* | 7/2010 | Zhang | H04N 21/4334 455/66.1 |
| 2011/0179231 A1* | 7/2011 | Roush | G06F 3/0622 711/152 |
| 2011/0252270 A1 | 10/2011 | Abraham et al. | |
| 2012/0259912 A1* | 10/2012 | Kruse | G06F 17/3012 709/203 |
| 2013/0036302 A1* | 2/2013 | Lord | H04L 63/0823 713/156 |
| 2013/0054910 A1 | 2/2013 | Vaghani et al. | |
| 2013/0227009 A1 | 8/2013 | Padmanaban et al. | |
| 2013/0258855 A1* | 10/2013 | Bos | H04L 12/185 370/235 |
| 2013/0346532 A1 | 12/2013 | D'Amato et al. | |
| 2014/0086100 A1* | 3/2014 | Keesara | H04L 12/44 370/255 |

OTHER PUBLICATIONS

Tanner, J., °CIFS: Common Internet File System, Unix Review, San Francisco, CA, US, vol. 31, Feb. 1, 1997, 9 pgs.

Postel, J. et al., "File Transfer Protocol (FTP)"; RFC 959.txt, ISI, Oct. 1, 1985, XP015006955, 70 pgs.

"How to use and troubleshoot FireWire target disk mode", Jun. 25, 2010, http://support.apple.com/kb/HT1661, obtained Nov. 4, 2014, 3 pgs.

Microsoft: "How cluster reserves a disk and brings a disk online", Feb. 11, 2005, XP055142011, Retrieved from the Internet: URL:https://web.archive.org/web/20050211054942/http://support.microsoft.com/kb/309186, [retrieved on Sep. 23, 2014], 2 pages.

PCT International Search Report and Written Opinion in Application PCT/US13/045726, mailed Sep. 9, 2013, 9 pgs.

PCT International Search Report and Written Opinion in Application PCT/US2014/039480, mailed Oct. 6, 2014, 12 pgs.

T10 Technical Committee et al: "SCSI Primary Commands—3 Revision 23", vol. dpANS, No. T10/1416-D, May 4, 2005, pp. I-XXV, I, XP002563347, Retrieved from the Internet: URL:http://www.t10.org, [retrieved on Oct. 13, 2006], 80 pgs.

U.S. Appl. No. 13/529,872, Office Action mailed Aug. 15, 2014, 18 pgs.

U.S. Appl. No. 13/407,428, Amendment and Response filed Oct. 15, 2013, 12 pgs.

U.S. Appl. No. 13/407,428, Notice of Allowance mailed Jan. 21, 2014, 5 pgs.

About Preventing Data Corruption with I/O Fencing, Retrieved on: Apr. 10, 2013, Available at: https://sort.symantec.com/public/documents/sfha/6.0.1/linux/productguides/html/sfsybasece_admin/ch01s03s07s02.htm, 5 pgs.

U.S. Appl. No. 13/407,428, Office Action mailed Aug. 6, 2013, 12 pgs.

Vogels, et al., "The Design and Architecture of the Microsoft Cluster Service—A Practical Approach to High-Availability and Scalability", In Proceedings of 28th International Symposium on Fault-Tolerant Computing, Jun. 23-25, 1998, pp. 422-431.

PCT International Search Report and Written Opinion in Application PCT/US2013/025798, mailed Jun. 3, 2013, 9 pgs.

European Office Action in Application 13732767.2, mailed Jan. 28, 2015, 2 pgs.

\* cited by examiner

Mobile Computing Device

DISTRIBUTED STORAGE DEFENSE IN A CLUSTER

BACKGROUND

In typical shared storage situations in which a cluster of nodes has access to a storage device, at least one node in the cluster is connected to the storage device. As a result, the node that is connected to the storage device is responsible for handling the defense of the storage device. However, in situations where the cluster has access to multiple storage devices, a single node in the cluster may not be connected to each storage device. As a result, some of the storage devices may be unprotected.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a method and system for enabling access to a storage device and for protecting one or more storage devices that are accessible by various nodes in a cluster. Specifically, one or more embodiments describe how a node may be admitted to a cluster and thereby obtain read and write access to a storage device that is connected to at least one node in a cluster of nodes. Additionally, one or more embodiments provide that nodes may monitor a registration table associated with a cluster and remove entries from non-recognized nodes. For those nodes that were removed, the node can attempt to re-register with the registration table to seek re-admission to the cluster.

As will be explained below, the node seeking access to the storage device uses cluster communication protocols to get into the cluster. Once admitted to the cluster, the node can be eligible to gain access to one or more storage devices utilized by the cluster. To gain access to the storage device, the node seeking access to the storage device sends a registration key to the storage device. After registering with the storage device, the node sets a registration timer. In embodiments, the registration timer is equivalent to a time period during which each node in the cluster has an opportunity to determine whether the node seeking access to the storage device should be granted the requested access. Upon expiration of the registration timer, the node seeking access to the storage device receives a registration table from the storage device. Once the registration table is received, the node determines whether its registration key is stored in the registration table. If the registration key is stored in the registration table, the node is permitted access to the storage device. More specifically, the node is granted write access to the storage device.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following Figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
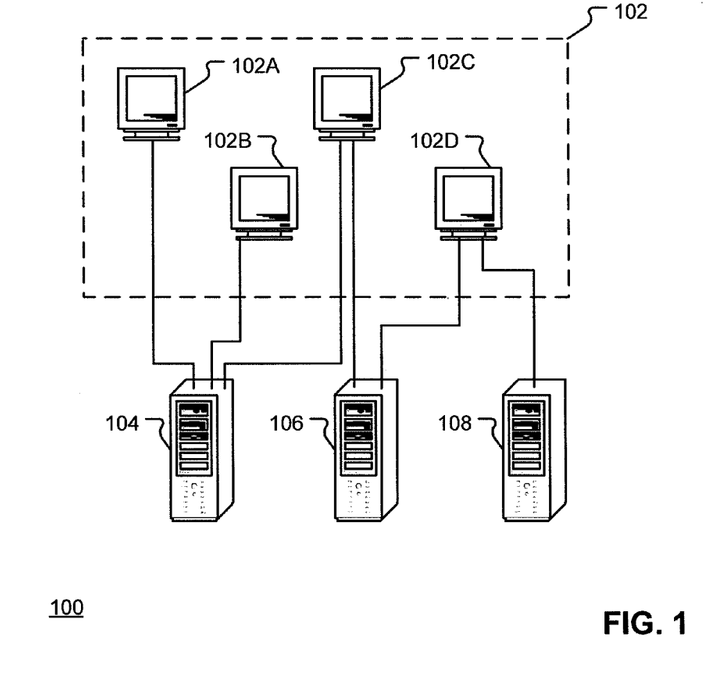
FIG. 1 illustrates a system in which a plurality of nodes in a cluster are connected to respective storage devices according to one or more embodiments of the present disclosure.

FIG. 1 illustrates a system 100 in which a plurality of nodes in a cluster 102 are connected to respective storage devices according to one or more embodiments of the present disclosure. As shown in FIG. 1, a cluster 102 may include a plurality of nodes 102A-102D. Although four nodes are shown, it is contemplated that the cluster 102 may have more than four nodes or fewer than four nodes. In certain embodiments, a node may be a computing device, such as, for example, a personal computer, tablet, laptop, smartphone, personal digital assistant and the like. In other embodiments, a node may be a server computing device.

FIG. 1 also shows that each node in the cluster 102 is connected to one or more storage devices. In certain embodiments, the storage device may be a direct attached storage device (i.e., a storage device that is directly connected to a host system or device). It is also contemplated that the storage device may be accessed by a number of nodes in the cluster using one or more paths. For example, one or more nodes may be physically connected to the storage device while other nodes in the cluster may use a remote path to connect to the storage device. In addition, a single node may have multiple physical connections to various storage devices and one or more remote connections to the various storage devices. It is also contemplated that each node in the cluster may be able to view the activity and connections of each of the other nodes in the cluster. In sum, the system 100 may be asymmetrical in that some storage devices are available to some nodes while other storage devices are not available to those nodes.

For example, as shown in FIG. 1, nodes 102A and 102B are connected to storage device 104, node 102C is connected to storage device 104 and storage device 106, and node 102D is connected to storage device 106 and storage device 108. In certain embodiments, the storage devices 104-108 comprise a storage pool. As there is not a single node in the cluster 102 that has access to each storage device in the storage pool, each node in the cluster 102 is responsible for running a defense algorithm to ensure that only nodes that are part of the cluster have read and write access to the storage devices. Thus, each node in the cluster 102 concurrently protects the storage devices that they are connected to in the storage pool.

Referring back to FIG. 1, each of nodes 102A, 102B and 102C are connected to storage device 104. As discussed, each of the nodes may have a physical connection to the storage device 104 or a remote connection (i.e., a connection to the storage device 104 through a node having a physical connection to the storage device 104). Because nodes 102A, 102B and 102C are connected to storage device 104, each node has read and write access to the storage device 104. Further, each of nodes 102A, 102B and 102C in the cluster 102 can detect the presence of the other nodes in the cluster 102 and determine the activity of each of the other nodes in the cluster.

In embodiments, rights to a particular storage device are determined by persistent reservation. That is, the storage device, such as, for example, storage device 104, maintains a reservation of a particular node even when the storage device is offline or has been rebooted. For discussion purposes, a reservation of a particular node occurs when a node reserves a particular storage device and prevents another, unauthorized, node from accessing the storage device.

Referring back to the example above, each of nodes 102A, 102B and 102C has read and write access to the storage device 104 because each of the nodes 102A, 102B and 102C are part of the cluster 102. As will be explained in detail below, each node in the cluster 102 runs a defense algorithm at a time t to determine whether any other node in the cluster 102 has lost connectivity to either: (i) the other nodes in the cluster, or (ii) the storage device 104.

If, for example, node 102A loses connectivity to the nodes 102B and 102C or to the storage device 104, node 102B or node 102C independently determine that node 102A should no longer have (at least) write access to the storage device 104 and thus be prohibited from accessing the storage device. When a connection has been lost, nodes 102B and 102C take the workload of node 102A and also take steps to ensure that node 102A can no longer write to the storage device 104 as permitting node 102A to write to the storage device may corrupt the data on the storage device 104. It is contemplated that although node 102A may have lost connectivity to nodes 102B and 102C, node 102A may still have connectivity to the storage device 104. Likewise, it is contemplated that if the node 102A lost connectivity to the storage device 104, node 102A may still be connected to node 102B and/or node 102C.

Returning to the example above, in order to prohibit node 102A from writing to the storage device 104, nodes 102B or 102C send a request to the storage device 104 to scratch node 102A from a node registration table. More specifically, a request is sent to the storage device to scratch a registration key associated with the node 102A from the node registration table. As a result, the storage device 104 will no longer accept write commands from a physical path or a remote path associated with node 102A. In certain embodiments, although node 102A will not have write access to the storage device 104, node 102A will still have read access to the storage device 104.

In certain embodiments, either of nodes 102B or 102C may send the scratch request independently from each other. In another embodiment, the nodes of a cluster may be required to reach a consensus on whether a particular node should be scratched. In still yet another embodiment, the node itself may determine that it should be removed from the cluster. For example, if node 102A determines that it has lost a connection to one of the other nodes or to the storage device 104, node 102A can remove one or more paths from itself to the storage device or instruct the storage device 104 to remove its registration key from the node registration table.

Referring to the node registration table, in certain embodiments, the node registration table is maintained by the storage device 104 and lists the nodes that have write access to the storage device 104. In embodiments, the node registration table includes a registration key for each node that has write access to the storage device. In certain embodiments, the registration key comprises a 64 bit integer having the following format: (i) a 32 bit hash of a cluster global unique identifier (that is the same for all nodes in the cluster); (ii) an 8 bit key revision; (iii) an 8 bit node number; and (iv) a 16 bit signature. Although a specific size and configuration of the registration key is set forth, it is contemplated that the registration key may have any number of bits and also have various configurations so long as the registration key is unique to each node.

As will be explained in greater detail below, once a node is scratched, the node may request re-admittance to the cluster. To request re-admittance, the node that was scratched may send an updated registration key to the storage device. Once the node has re-registered with the storage device, each of the other nodes in the cluster make a determination as to whether the node should re-admitted to the cluster. Based on the determination of the nodes in the cluster, the node seeking re-admittance may be granted re-admittance or denied re-admittance. In embodiments, the nodes in the cluster may base their determination on any number of factors including, connectivity speed of the node seeking re-admittance, reliability of the node seeking re-admittance, access that the node seeking re-admittance has to other storage devices in a storage pool and the like.

Figure 2:
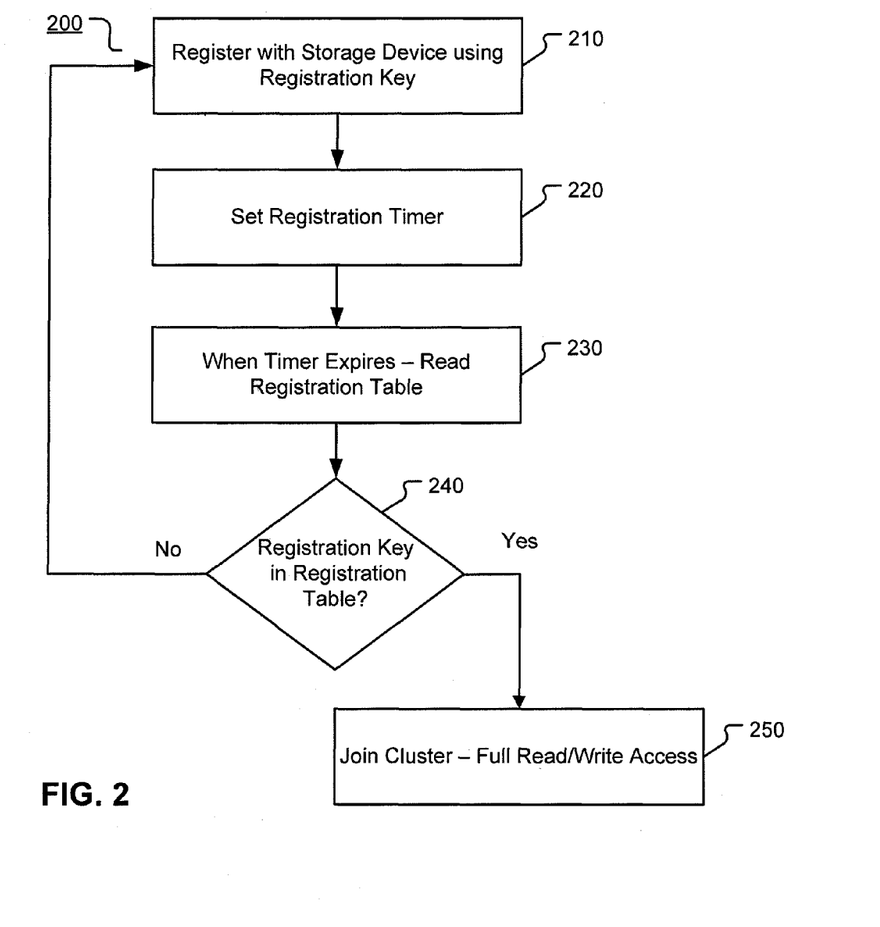
FIG. 2 illustrates a method for requesting membership in a cluster according to one or more embodiments of the present disclosure.

FIG. 2 illustrates a method 200 for requesting membership in a cluster according to one or more embodiments of the present disclosure. In certain embodiments, the method 200 may be used by a node to request membership in a cluster such as cluster 102 of FIG. 1. As discussed above, once the node has been admitted to the cluster, the node may have read and write access to that particular storage device.

Specifically, a joining node may attempt to use cluster communication protocols to communicate with other nodes in order to gain admittance to an active cluster. In this case, once the joining node enters the active state, it will execute method 200 to gain access to the storage. If the joining node fails to communicate with other joining or active nodes via cluster protocols, and the joining node believes that there might not be an active cluster, the joining node may execute the method 200 to gain access to storage and thus become the first active node. For purposes of discussion, when the node requests access to and gains admittance to a cluster, the node is seen as an active node or entering the active state. For example, all nodes that are running the cluster communication protocol and are currently participating in cluster membership are considered active nodes. Additionally, nodes that have access to the one or more storage devices associated with a cluster are considered storage nodes. In embodiments, storage nodes are subsets of active node sets.

As shown in FIG. 2, method 200 begins after a node has been admitted to a cluster using a cluster communication protocol. Once admitted to the cluster, one or more embodiments provide that the node seeks to access one or more storage devices associated with the cluster, such as, for example, storage device 104 (FIG. 1) by registering 210 with the storage device using a registration key. As discussed, the registration key may comprise a 64 bit integer having various components discussed above.

Once the registration key has been sent to the storage device, flow proceeds to operation 220 in which a registration timer is set. In certain embodiments, this registration timer may be maintained by the node that is requesting access to the storage device or to a storage pool. However, it is contemplated that the storage device or another node in the cluster could also maintain the registration timer. In embodiments, the length of the registration timer is equivalent to a time period t. In certain embodiments the time period t is 3 seconds. More specifically, the time period t is equivalent to the time it any other node in the cluster to perform a scrub that should occur every 3 seconds (taking into account any delays that may occur due to CPU loads, I/O latency and the like.

Upon expiration of the timer, flow proceeds to operation 230 in which the node registration table is read from the storage device. As discussed above, the node registration table is maintained by the storage device (or by at least one storage device in a storage pool) and contains a listing of each registration key associated with every node in the cluster.

Once the registration table is received and read, flow proceeds to operation 240 in which it is determined whether the node's registration key is contained in the node registration table. If the node's registration key is contained in the node registration table, each of the nodes in the cluster have run the defense algorithm and the storage device has accepted the node's request for access to the storage device. As a result, flow proceeds to operation 250 in which the node is permitted to access the storage device, and more specifically, to have write access to the storage device.

However, if it is determined in operation 240 that the requesting node's registration key is not in the node registration table, flow proceeds back to operation 210 and the node attempts to register with the storage device a second time. The method repeats and the node requesting access to the storage device again requests and reads the registration table to determine whether its registration key is stored in the node registration table.

Figure 3:
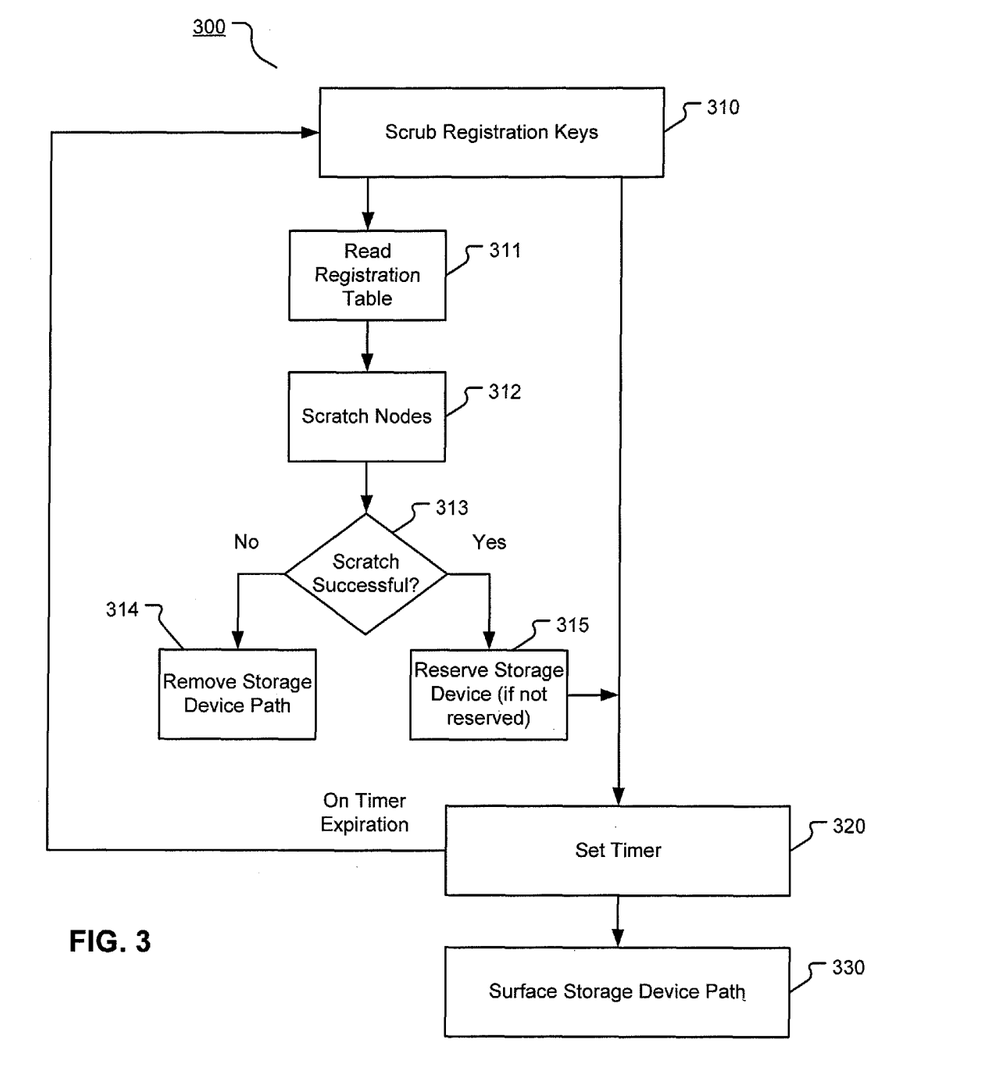
FIG. 3 illustrates a method for determining access to a storage device associated with a cluster of nodes according to one or more embodiments of the present disclosure.

FIG. 3 illustrates a method 300 for determining access to a storage device associated with a cluster of nodes according to one or more embodiments of the present disclosure. In certain embodiments, method 300 is performed by each node in the cluster that is seen as an active node (i.e., all nodes that are running the cluster communication protocol and are currently participating in the cluster membership). Method 300 may also be performed by a node that is considered a storage node (i.e., any node that has access to one or more storage devices associated with the cluster).

Method 300 begins when a node "scrubs" 310 registration keys from the node registration table. Specifically, a node looks for other nodes that are not part of an active cluster. When a registration key is scrubbed from the disk registration table, the node associated with the scrubbed registration key no longer has (at least) write access to a particular storage device or storage pool associated with the cluster. In certain embodiments, a registration key is scrubbed when one node in a cluster believes that another node in the cluster should no longer have write access to the particular storage device or storage pool. This may be the result of one of the nodes losing a connection to another node in the cluster, a node removing itself from the cluster or from a node losing a connection to the storage device. In situations in which a node has removed itself from the cluster, that node may send a request to the storage device indicating that its registration key should be removed from the node registration table. In another embodiment, one of the other nodes in the cluster may request that the node be scratched (i.e., removed) from the cluster during the scrubbing process. In certain embodiments, when a node is scratched from the cluster, the other nodes may be configured to prevent the commands from the removed node from reaching the storage device.

As shown in FIG. 3, the scrubbing process has various sub-operations. The scrubbing process begins in sub-operation 311 in which a node reads the node registration table maintained by the storage device. As discussed above, the node registration table contains a list of all the registration keys associated with each node in the cluster.

Flow then proceeds to sub-operation 312 in which one or more nodes that do not have active membership in the cluster are scratched from the cluster. In embodiments, each node in the cluster is viewable by every other node in the cluster and may be connected to one or more storage devices either by a remote connection or a physical connection. As each node in the cluster has a view of every other node in the cluster, the node that is reading the node registration table can determine which nodes in the cluster have associated registration keys in the node registration table. Thus, a node scrubs a registration table received from a storage device. If a registration key is in the table but the node is not active, the node is scratched.

In certain embodiments, a node may not be scratched until multiple nodes in the cluster reach a similar determination (i.e., that the node being scratched does not have a registration key in the node registration table). In other embodiments, a node may be scratched when a single node reaches a determination that the node to be scratched does not have an associated registration key in the node registration table.

Once a request has been sent for the node to be scratched, the node running the algorithm determines 313 whether the node was successfully scratched. If the node was not successfully scratched, the node running the algorithm performs a self-check to determine whether its own registration key is present in the node registration table. If its own registration key is not present in the node registration table, flow proceeds to sub-operation 314 and the node enters the "guest state" and seeks re-admittance to the cluster using one or more cluster protocols. If the node was successfully scratched, flow proceeds to operation 315 and the node reserves the storage device if the storage device has not already been reserved. That is, the node takes ownership of the storage device and then share access to this storage device with other nodes that are in the same cluster.

When the registration keys in the node registration table have been scrubbed, flow proceeds to operation 320 in which a second timer is set. In embodiments, the second timer is proportional to the registration timer discussed in FIG. 2. For example, the scrubbing algorithm runs in parallel on all the nodes (e.g., each node scrubs keys every 3 seconds independently of all the other nodes. In certain embodiments, the scrubbing algorithm runs in parallel because one node may not be able to reliably tell if another node is also scrubbing the registration table or if the one of the nodes has lost its connection to the storage and therefore can't scrub the registration table.

When a node joins the cluster, the node registers with the cluster and waits to get admitted. If the node is admitted, one embodiment provides that the node scrubs and surfaces the disk as soon as it can. The three second scrubbing timer is set and the node can validate its own registration on the storage.

Upon expiration of the timer, flow proceeds to operation 330 in which the node surfaces one or more paths to the storage device. That is, the node may determine which paths, either physical or remote, need to be connected to other nodes and/or storage devices in the cluster. For example, referring to FIG. 1, if node 102B joined the cluster 102, and node 102A established or has a physical connection to the storage device 104, the physical path is advertised to other nodes in the cluster and the other nodes in the cluster, for example, 102D, may establish a remote path to node 102A and take advantage of the physical connection between node 102A and the storage device 104.

Figure 4:
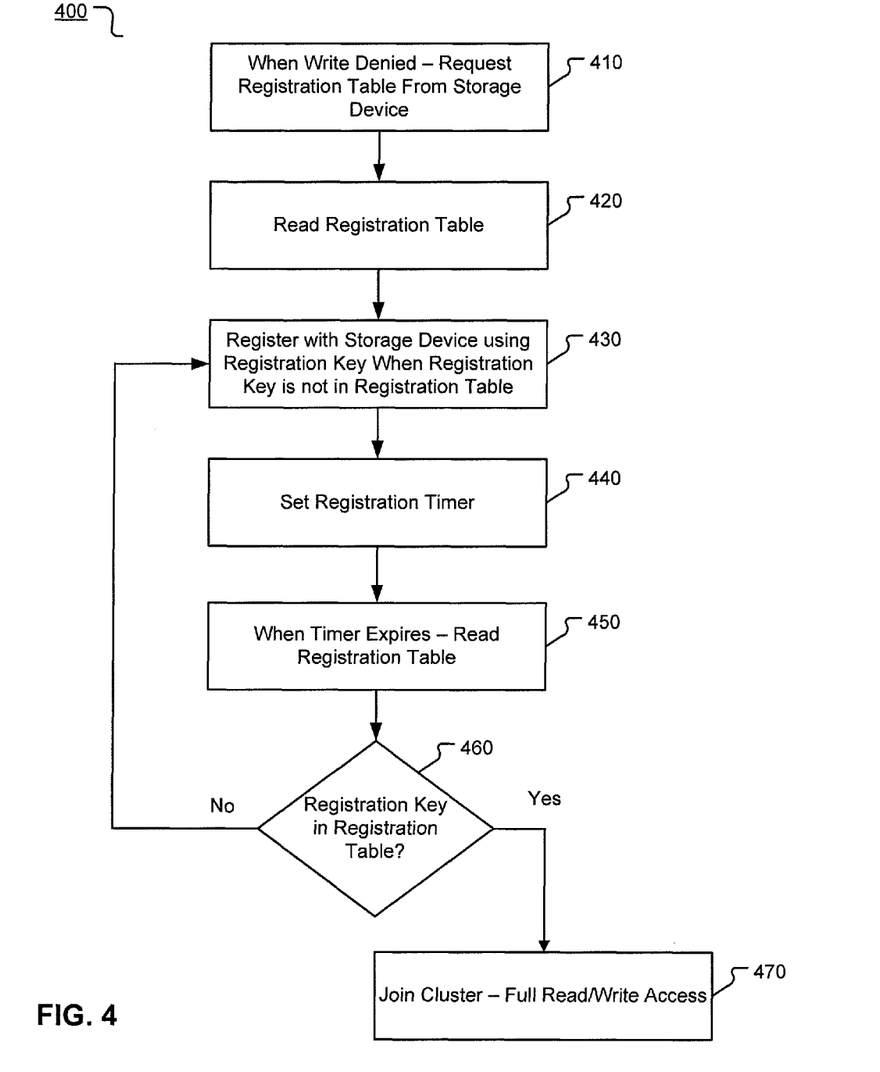
FIG. 4 illustrates a method for requesting re-admittance in a cluster according to one or more embodiments of the present disclosure.

FIG. 4 illustrates a method 400 for requesting re-admittance to a cluster according to one or more embodiments of the present disclosure. In certain embodiments, a node seeking re-admittance to the cluster may have removed itself from the cluster or may have been removed by another node in the cluster as discussed above with respect to FIG. 3. In embodiments, method 400 begins when a node in a cluster sends a write command to a storage device and is notified that the write was not successful. If a write was unsuccessful, the node may request that the command be sent down a different path. Additionally, or alternatively, the node may request that all other pending commands that are in progress be canceled. Upon receipt of the notification, the node requests 410 the node registration table from the storage device. As discussed above, the node registration table is maintained by the storage device and includes various registration keys that are associated with respective nodes in the cluster.

When the node registration table has been received by the requesting node, the node reads 420 the registration table to determine whether its own registration key is contained in the registration table. When it is determined that the node's registration key is not in the node registration table, the node registers 430 with the storage device using another registration key. As discussed above, the registration key may be a 64 bit integer having a 32 bit hash of a cluster global unique identifier, an 8 bit key revision, an 8 bit node number and a 16 bit signature. In certain embodiments, as the node has to re-register, the node may generate a new registration key where at least a portion of the registration key is incremented or changed. Thus, the node, the storage device or other nodes in the cluster may track the number of times a new path has to be set up for the node. In some embodiments, the number of times the node has requested re-admittance may affect the node obtaining re-admittance to the cluster. In addition, the change to the registration key helps ensure that write commands coming from the node and/or from paths associated with the node (when the node is re-admitted to the cluster) are distinguishable from stale write commands from the node that may still be waiting to be written to the storage device.

Once the node has registered its newly generated registration key with the storage device, a registration timer is set 440. As previously discussed, the length of the registration timer is equivalent to about 2.5 times the time period t. That is, the time period t is equivalent to the time it takes each node in the cluster to run the defense algorithm disclosed herein.

Upon expiration of the timer, flow proceeds to operation 450 and the node seeking write access to the storage device reads the registration table maintained by the storage device. If it is determined 460 that the newly generated registration key is in the node registration table, the node is granted write access to the storage device.

However, if it is determined in operation 460 that the node's newly generated registration key is not in the node registration table, flow proceeds back to operation 430 node re-registers and the registration time is reset. In certain embodiments, if the node has been rejected a determined number of times, the node will no longer seek write access to the storage device. In certain embodiments, the node may again seek admittance to the cluster or access to the storage device after a determined period of time has elapsed.

Figure 5:
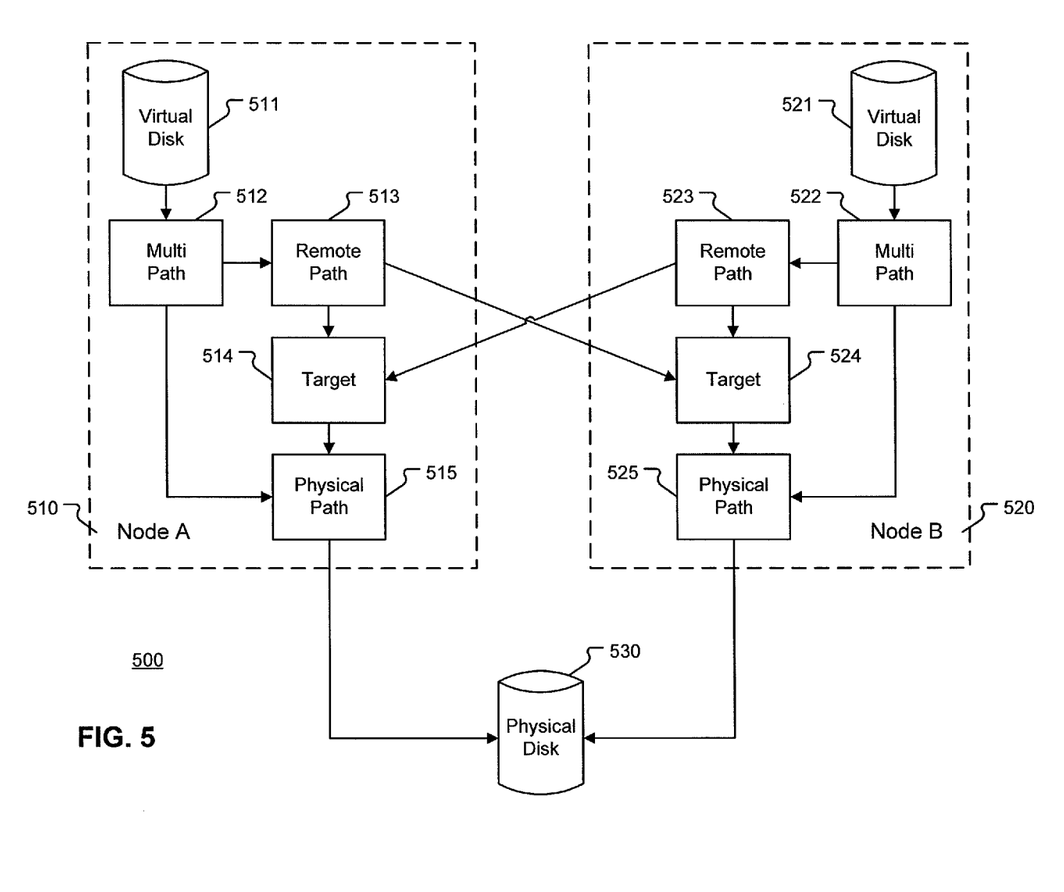
FIG. 5 is a block diagram illustrating how various nodes in a cluster may be connected to a physical storage device according to one or more embodiments of the present disclosure.

FIG. 5 is a block diagram illustrating a system 500 by which two nodes in a cluster may access a physical disk using remote paths and/or physical paths according to one or more embodiments of the present disclosure. As discussed above with reference to FIGS. 1 through 4, various nodes in a cluster may be connected to one or more storage devices in a storage pool. Those connections (or spindles) can be physical connections or remote connections. As will be explained below, a node may utilize various paths to connect to one or more storage devices.

In the exemplary embodiment shown in FIG. 5, the cluster may have two nodes, Node A 510 and Node B 520. Each node may have a physical connection to a physical Disk 530. Although only two nodes are shown, it is contemplated that a cluster may consist of more than two nodes. Additionally, it is contemplated that each node may have a physical connection to one or more storage devices. As shown in FIG. 5, a node may have access to a physical disk through a number of different paths. For example, Node A 510 has a physical path to the physical disk 530 and also has a remote path to the physical disk 530 through the target 524 of Node B 520. In certain embodiments, a single node may have multiple physical paths to the same disk. In such embodiments, the node will expose all these physical paths to all of the other nodes in the cluster.

As also shown in FIG. 5, Node A has access to a virtual disk 511, a multi path object 512 that aggregates multiple physical paths and remote paths to a physical disk 530, a remote path object 513 that instantiates one or more remote paths to the physical disk 530 through another node, such as, for example, Node B 520, a target object 514 which serves to advertise one or more physical connections between Node A 510 and the physical disk 530 and which allows other nodes in the cluster to gain connectivity (e.g., through a remote path) to the physical disk 530 via Node A 510, and a physical path object 515 instantiates one or more physical connections or paths to the physical disk 530.

Likewise, Node B 520 has access to a virtual disk 521, a multi-path object 522 that aggregates multiple physical paths and remote paths from Node B 520 to the physical disk 530, a remote path object 523 that 513 that instantiates one or more remote paths to the physical disk 530 through another node, such as, for example, Node A 510, a target object 524 that advertises the physical path to the physical disk 530 to other nodes in the cluster, and a physical path object 525 that instantiates one or more physical connections or paths to the physical disk 530. Although one remote path is shown for both Node A 510 and Node B 520, it is contemplated that a single node may have multiple remote paths. It is also contemplated that each node may have multiple physical paths.

In embodiments, the preferred path through which various commands are sent to the physical disk 530 is the physical path. For example, when a new disk is detected, one or more nodes of the cluster will register or reserve the disk. As discussed above, this process includes running the defense algorithm discussed above with respect to FIG. 2 and subsequently creating a physical path from the node to the physical disk. In certain embodiments, each physical path, or each new instance of a physical path has a registration key that includes a cluster identifier, node identifier and a reincarnation identifier (a unique number for the physical path that is incremented each time a physical path is instantiated). In embodiments, the registration key of the path may be equivalent to the registration key of the associated node. Once the physical connection is established and the node registers with the disk using the registration key, the multi path object and the target object of the node is notified of the newly established physical path. That information is then transmitted to other nodes in the cluster so the other nodes may establish a remote path via the target of the node having the physical connection to the physical disk.

As discussed above, it is contemplated that one or more nodes may lose a connection to one or more other nodes in the cluster or to the physical disk. In such an event, one of the connected nodes in the cluster will request that one or more paths from the disconnected node be removed and also request that the storage device stop taking write request from one or more paths (e.g., physical paths or remote paths) associated with the disconnected nodes. Likewise, the targets associated with each node that have a remote connection to the disconnected node may also stop receiving commands from the disconnected node. Such actions prevent the disconnected node from sending additional and/or duplicate writes to the storage device that may be on the wire but not yet completed. That is, removing registration keys from the storage device and blocking write command through the target helps to ensure that disconnected nodes can't write to a disk using physical paths or remote paths.

For example, referring to FIG. 5, Node A 510 may have lost its physical connection via its physical path object 515 to the physical disk 530. However, as shown, Node A 510 also has a remote path 513 to the physical disk 530 through the target object 524 of Node B 520. Additionally, prior to losing the connection to the physical disk 530, Node A 510 may have sent write commands to the physical disk 530 that have not yet completed. As Node A 510 has lost connectivity td the physical disk 530, Node A 510 may have no knowledge of whether its write commands were executed or rejected.

However, if Node A 510 were allowed to immediately reconnect with the physical disk 530 and either re-submit the commands that may or may not have been executed, or if Node A 510 were permitted to send additional commands to the physical disk 530 (which may be out of order due to Node A 510 losing its connection), such actions may cause the data in the physical disk 530 to become corrupt. To prevent such corruption, Node B 520 preempts the physical path and/or all remote paths associated with Node A 510.

Once the physical and/or remote paths associated with Node A 510 are preempted, the physical disk 530 will not accept commands from the paths associated with Node A 510. As each path for each node has an associated identifier, the physical disk 530 can determine which commands are associated with the node based on the identifier of each of the paths. In certain embodiments, physical disk 530 distinguishes between physical paths. Thus, if the I/O came through a remote path, from the physical disk's perspective, the I/O would appear as if it came from the node that hosts the target to which the remote path is connected. In short, remote path I/O fencing is performed at the target while physical path I/O fencing is performed at the physical disk 530 level.

To further the example, each node in the cluster can see each spindle or path of every other node. Thus, Node B 520 can see that Node A 510 lost a connection to the physical disk 530. As a result, Node B 520 will discard remote path 523. However, if Node A 510 cannot communicate to the other nodes in the cluster, Node B 520 may instruct the physical disk 530 to reject write commands from Node A 510.

In certain embodiments, once the physical disk 530 starts rejecting the commands from the physical path of Node A 510, the multi path object 512 of Node A 510 detects the rejection of the commands. As a result, the multi path object 512 may query all other existing physical paths to determine if any are valid. If one physical path is still valid, the valid physical path is added to the multi path object 512. However, if there are no valid physical path objects, a new multi path object is created and the physical path object 515 instantiates a new physical path with a new registration key. When generated, the new physical path and its associated registration key will have a new reincarnation identifier that sets it apart from the now defunct identifier associated with the old physical path.

Additionally, when the node, such as, for example, Node A 510 requests re-admittance to the cluster using the new identifier, the new identifier is advertised to other nodes in the cluster. Thus, the remote path objects of other nodes can use the new identifier of the physical path of Node A 510 to connect to the physical disk 530. As discussed above, as the physical disk 530 knows not to accept commands from the old physical path, the physical disk accepts commands from the new physical path and it associated identifier when Node A 510 seeks re-admittance to the cluster through the methods described above with references to FIGS. 2-4.

Referring back to FIG. 5, if Node A 510 and Node B 520 lose connectivity to each other, there may be data in a cache of an application that has not been written to the virtual disk or there may be data in the virtual disk that has not been written to the physical disk. Accordingly embodiments provide that all remaining commands on a path from a disconnected node be drained and that no further commands be accepted from the paths associated with the disconnected node.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
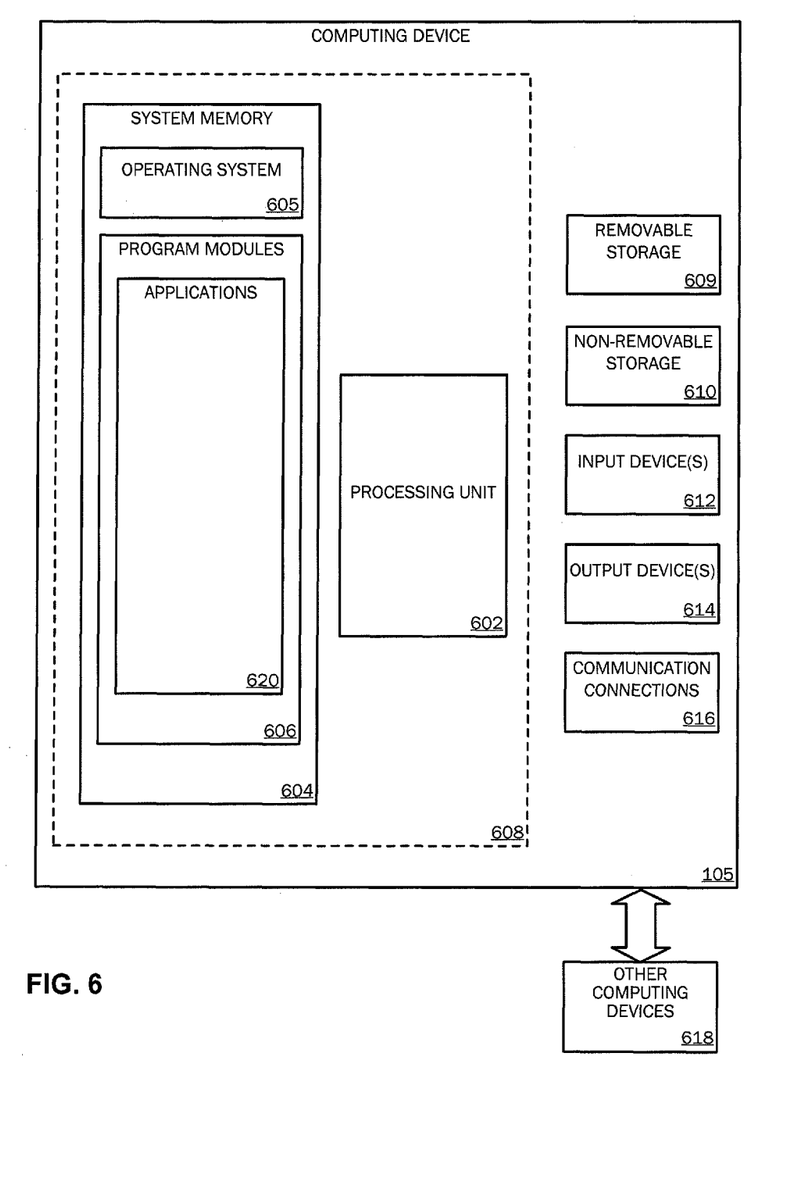
FIG. 6 is a block diagram illustrating example physical components of a computing device that may be used with one or more embodiments of the present disclosure.
Figure 7A:
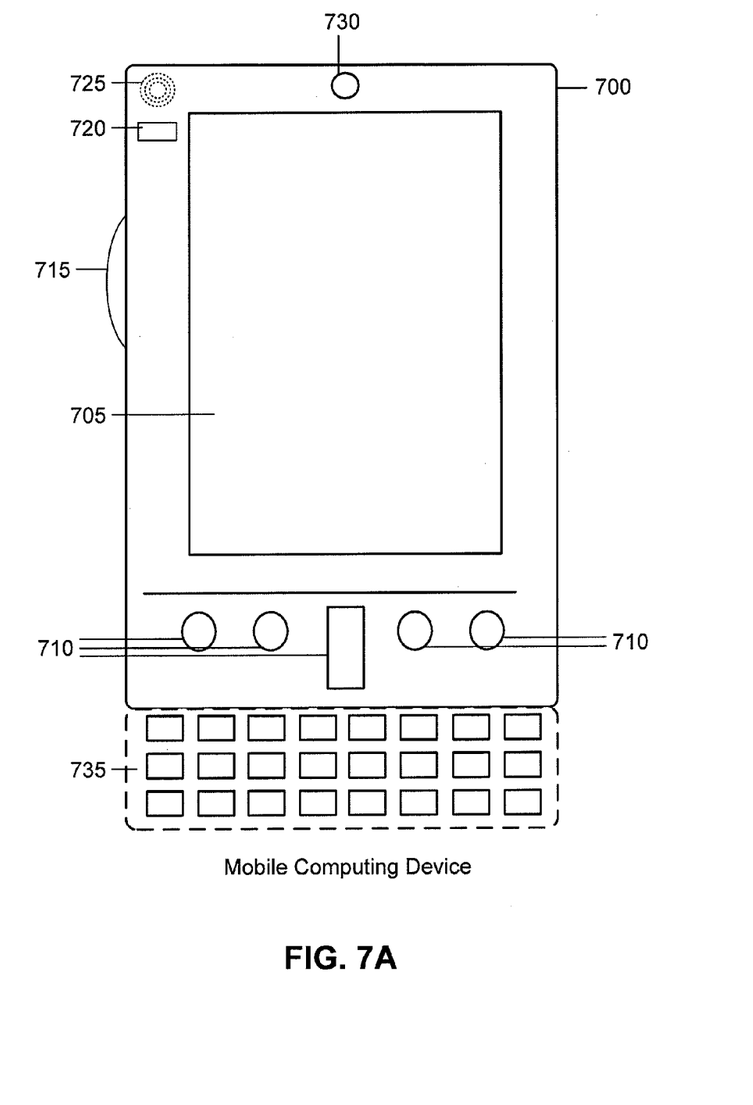
FIGS. 7A and 7B are simplified block diagrams of a mobile computing device that may be used with one or more embodiments of the present disclosure.
Figure 7B:
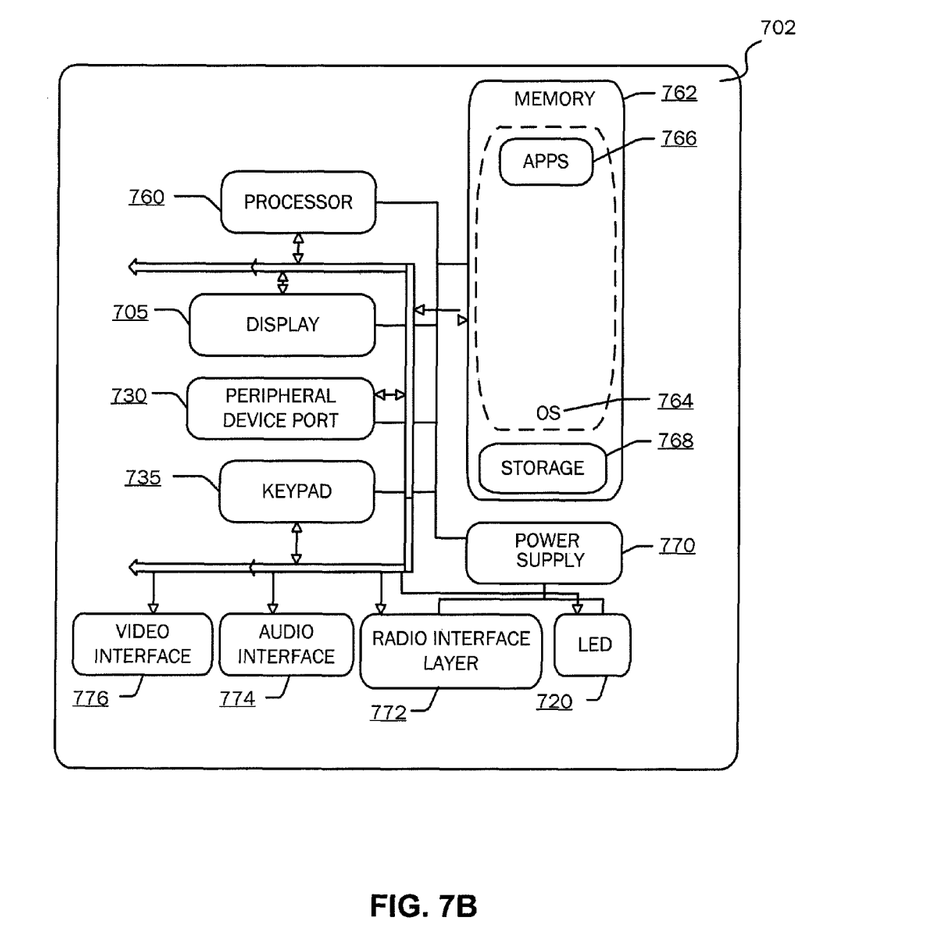
Figure 8:
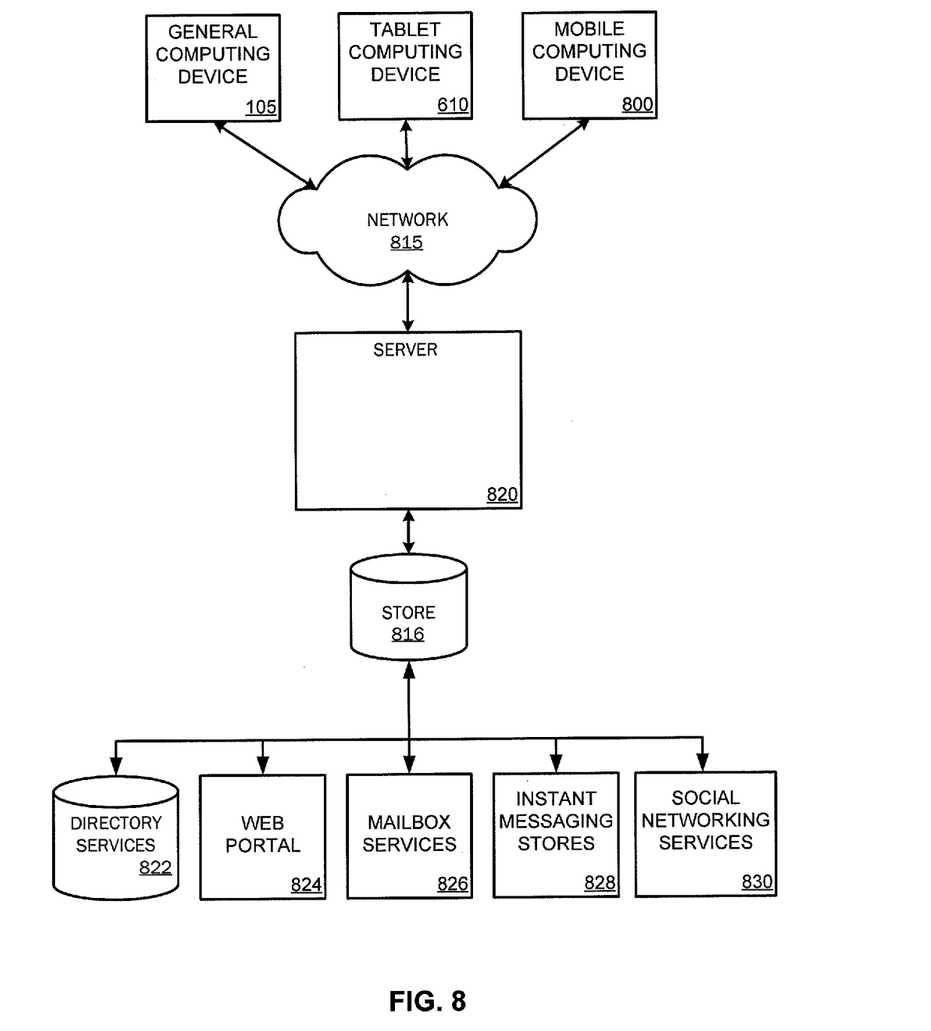
FIG. 8 is a simplified block diagram of a distributed computing system that may be used with one or more embodiments of the present disclosure.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating physical components (i.e., hardware) of a computing device 105 with which embodiments of the invention may be practiced. The computing device components described below may be suitable for the nodes or computing devices described above. In a basic configuration, the computing device 105 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software various applications 620. The operating system 605, for example, may be suitable for controlling the operation of the computing device 105. Furthermore, embodiments of the invention may be practiced in conjunction with a graphics library, other operating systems, or any other application program and is not limited to any particular application or system. This basic configuration is illustrated in FIG. 6 by those components within a dashed line 608. The computing device 105 may have additional features or functionality. For example, the computing device 105 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the stages of the methods illustrated in FIGS. 1-4. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 105 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 105 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 104 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 105. Any such computer storage media may be part of the computing device 105. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which embodiments of the invention may be practiced. With reference to FIG. 7A, one embodiment of a mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera, 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system for providing and maintaining membership in a cluster as described above. For example, the node registration table, identifiers, and the various paths between nodes and between nodes and the physical disk may be stored in different communication channels or other storage types. For example, various identifiers may be stored using a directory service 822, a web portal 824, a mailbox service 826, an instant messaging store 828, or a social networking site 830. A server 820 may provide data and/or connection types to one or more other servers or nodes in the cluster. As one example, the server 820 may be a web server that provides data over the web to clients through a network 815. By way of example, the client computing device may be implemented as the computing device 105 and embodied in a personal computer, a tablet computing device 610 and/or a mobile computing device 700 (e.g., a smart phone). Any of these embodiments of the client computing device 105, 610, 700 may obtain content from the store 816.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for enabling access to a storage device, the method comprising:
   sending by a particular node a write request to the storage device;
   receiving by the particular node a registration table from the storage device, wherein the registration table identifies one or more other nodes in a cluster of nodes;
   determining by the particular node that a first registration key of the particular node is not present in the registration table;
   sending by the particular node a second registration key to the storage device for re-admittance to the cluster and write access to the storage device;
   based on sending the second registration key, setting by the particular node a first registration timer, wherein the first registration timer provides a time period for one or more nodes in the cluster of nodes to modify the registration table maintained by the storage device;
   upon expiration of the first registration timer, receiving by the particular node the registration table from the storage device, wherein the registration table includes modifications from the one or more other nodes in the cluster of nodes during the time period;
   determining by the particular node whether the second registration key is stored in the registration table; and
   when the second registration key is stored in the registration table, establishing a remote connection to the storage device through the one or more other nodes in the cluster and writing to the storage device.

2. The method of claim 1, further comprising scrubbing the registration table after joining the cluster.

3. The method of claim 2, wherein scrubbing the registration table comprises:
   receiving the registration table from the storage device;
   reading the registration table;
   scratching one or more registration keys from the registration table, wherein each of the one or more registration keys is associated with an other node in the cluster.

4. The method of claim 3, further comprising setting a second registration timer, wherein the first registration timer is at least two times longer than the second registration timer.

5. The method of claim 1, wherein the registration key comprises a cluster identifier and a node identifier.

6. A computer-readable storage device encoding computer executable instructions which, when executed by one or more processors, performs a method for enabling access to a storage device, the method comprising:
   sending by a particular node a write request to the storage device;
   receiving by the particular node a registration table from the storage device, wherein the registration table identifies one or more other nodes in a cluster of nodes;
   determining by the particular node that a first registration key of the particular node is not present in the registration table;
   sending by the particular node a second registration key to the storage device;
   based on sending the second registration key, setting by the particular node a first registration timer, wherein the first registration timer provides a time period for the one or more other nodes in the cluster of nodes to modify the registration table maintained by the storage device;
   upon expiration of the first registration timer, receiving by the particular node the registration table from the storage device, wherein the registration table includes modifications from the one or more nodes in the cluster of nodes during the time period;
   determining by the particular node whether the second registration key is stored in the registration table; and
   when the second registration key is stored in the registration table, establishing a remote connection to the storage device through the one or more nodes in the cluster and writing to the storage device.

7. The computer-readable storage device of claim 6, further comprising instructions for scrubbing the registration table after joining the cluster.

8. The computer-readable storage device of claim 7, wherein scrubbing the registration table comprises:
  receiving the registration table from the storage device;
  reading the registration table;
  scratching one or more registration keys from the registration table, wherein each of the one or more registration keys is associated with an other node in the cluster.

9. The computer-readable storage device of claim 8, further comprising instructions for setting a second registration timer, wherein the first registration timer is at least two times longer than the second registration timer.

10. The computer-readable storage device of claim 9, further comprising instructions for creating a connection to the storage device.

11. The computer-readable storage device of claim 10, wherein the connection is a physical connection.

12. The computer-readable storage device of claim 6, wherein the registration key comprises a cluster identifier and a node identifier.

13. A method for enabling access to a storage device, the method comprising:
  sending, from a particular node in a cluster, a write command to the storage device, wherein the particular node has an associated registration key; and
  upon receiving a notification that the write command was rejected:
    requesting by the particular node a registration table from the storage device;
    determining by the particular node whether the registration key associated with the particular node is present in the registration table; and
    when the registration key associated with the particular node is not present in the registration table:
      sending by the particular node a new registration key to the storage device;
      setting by the particular node a first registration timer, wherein the first registration timer provides a time period for one or more other nodes in the cluster of nodes to modify the registration table maintained by the storage device;
      upon expiration of the first registration timer, receiving by the particular node the registration table from the storage device, wherein the registration table includes modifications from the one or more other nodes in the cluster of nodes during the time period;
      determining by the particular node whether the new registration key is stored in the registration table; and
      when the new registration key is stored in the registration table, joining the cluster, wherein joining the cluster enables the particular node to write to the storage device by establishing a remote connection to the storage device through the one or more nodes in the cluster.

14. The method of claim 13, further comprising scrubbing the registration table after joining the cluster.

15. The method of claim 14, wherein scrubbing the registration table comprises:
  receiving the registration table from the storage device;
  reading the registration table;
  scratching one or more registration keys from the registration table, wherein each of the one or more registration keys is associated with an other node in the cluster.

16. The method of claim 15, further comprising setting a second registration timer, wherein the first registration timer is at least two times longer than the second registration timer.

17. The method of claim 15, wherein scratching one or more registration keys causes the associated node to be denied access to the storage device.

18. The method of claim 13, wherein the new registration key comprises a cluster identifier and a node identifier.

19. The method of claim 1, wherein the first registration timer is configured for a time period sufficient to allow all nodes within the cluster of nodes to scrub the registration table.

20. The method of claim 3, wherein scratching the one or more registration keys is based on connectivity speed of an other node in the cluster.

* * * * *